US008425092B2

(12) United States Patent
Kobayashi

(10) Patent No.: US 8,425,092 B2
(45) Date of Patent: Apr. 23, 2013

(54) HEADLAMP CONTROL DEVICE AND VEHICLE HEADLAMP HAVING HEADLAMP CONTROL DEVICE

(75) Inventor: Shoji Kobayashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 444 days.

(21) Appl. No.: 12/548,768

(22) Filed: Aug. 27, 2009

(65) Prior Publication Data

US 2010/0052550 A1    Mar. 4, 2010

(30) Foreign Application Priority Data

Aug. 28, 2008    (JP) ................................. 2008-220360

(51) Int. Cl.
*B60Q 1/00* (2006.01)
*B60Q 1/06* (2006.01)
*F21V 1/00* (2006.01)
*F21V 21/28* (2006.01)

(52) U.S. Cl.
USPC ............................. 362/466; 362/465; 362/525

(58) Field of Classification Search .................. 362/466, 362/465, 525
See application file for complete search history.

(56) References Cited

U.S. PATENT DOCUMENTS

| 6,343,869 | B1 * | 2/2002 | Kobayashi | 362/37 |
| 6,906,467 | B2 * | 6/2005 | Stam et al. | 315/82 |
| 6,960,005 | B2 * | 11/2005 | Daicho et al. | 362/466 |
| 6,966,681 | B2 * | 11/2005 | Stephan et al. | 362/464 |
| 7,646,888 | B2 * | 1/2010 | Tsukamoto | 382/104 |
| 8,232,895 | B2 * | 7/2012 | Kamioka | 340/937 |
| 2005/0036325 | A1 * | 2/2005 | Furusawa et al. | 362/460 |
| 2005/0219852 | A1 * | 10/2005 | Stam et al. | 362/466 |

FOREIGN PATENT DOCUMENTS

| JP | 7101291 A | 4/1995 |
| JP | 2000233684 A | 8/2000 |
| JP | 2008037240 A | 2/2008 |

OTHER PUBLICATIONS

Adrian, single page, 1989.
Blackwell, p. 638, 1946.
Otani, Yasuyuki et al, "Illumination Engineering", Revised Edition, Electric Association (Ohmsha, Ltd.), p. 226-227, Sep. 12, 1978.
Inoue, Yoko et al. "Eye Sensitivity during Adapted Transition" Japanese Architectural Association Measuring System Collected Papers, 1995, No. 468, p. 11-16.

* cited by examiner

*Primary Examiner* — David J Makiya
(74) *Attorney, Agent, or Firm* — Sughrue Mion, PLLC

(57) ABSTRACT

A headlamp control device is provided. The device includes a visual object luminance unit, an adapted state unit, a recognition limit unit, a visual object recognition unit, and a light distribution control unit. The visual object luminance unit estimates a visual object luminance based on information about a vehicle forward captured image. The adapted state unit estimates an adaptation luminance based on the information about the vehicle forward captured image. The recognition limit unit estimates a recognition limit luminance, in the visual object range, based on at least the adaptation luminance. The visual object recognition unit determines whether the visual object luminance is less than the recognition limit luminance. The light distribution control unit controls a light distribution of a headlamp unit such that the visual object luminance is included in a range of the recognition limit luminance, if the visual object luminance is less than the recognition limit luminance.

7 Claims, 7 Drawing Sheets

HEADLAMP CONTROL DEVICE AND VEHICLE HEADLAMP HAVING HEADLAMP CONTROL DEVICE

This application claims priority from Japanese Patent Application No. 2008-220360, filed on Aug. 28, 2008, the entire contents of which are herein incorporated by reference.

BACKGROUND OF THE INVENTION

1. Technical Field

The present disclosure relates to a headlamp control device and a vehicle headlamp having the headlamp control device.

2. Related Art

Currently, a so-called Adaptive Front-lighting System (AFS) is developed which can obtain an appropriate visualizing performance by changing an irradiation range of a headlamp in accordance with a driving environment. This system is configured to move the irradiation range of the headlamp in a transverse direction in accordance with a steering amount of a handle or to change the irradiation range of the headlamp based upon whether a vehicle is traveling in a city or on a highway.

In addition to the AFS, the vehicle headlamp is generally capable of selecting a low beam or a high beam. The low beam is used to illuminate a near area with a certain light intensity, and a light distribution regulation is determined so as not to cause glare to an oncoming vehicle or a preceding vehicle, where the low beam is mainly used upon traveling in the city. On the other hand, the high beam is used to illuminate a forward broad range and a far position with comparatively high illumination, and is mainly used upon traveling a road where few oncoming vehicles or preceding vehicles exist. Accordingly, the high beam improves the visualizing performance enabling a driver to more easily see a visual object compared with the low beam, but may cause glare to a pedestrian or a driver of a vehicle existing in front of the vehicle.

For this reason, a technology for changing a light distribution in the range of the high beam has been proposed. JP-A-2008-37240 describes a related art vehicle head lamp which turns off a high beam unit, which is illuminating a high beam irradiation area that has an irradiation prohibition object therein, among a plurality of high beam units.

In addition, in the case where a vehicle selecting the high beam causes glare to the driver of the preceding vehicle traveling in front of the vehicle, a degree of the glare changes in accordance with a distance. For this reason, JP-A-2000-233684 and JP-A-H07-101291 describe a headlamp device which suppresses glare by moving a cutoff line or controlling luminance of a lamp in accordance with the position of the preceding vehicle.

In order to prevent a traffic accident between the vehicle and a pedestrian, it is important for the driver of the vehicle to be able to accurately check for the existence of the pedestrian. However, the above-described technologies are contrived from the viewpoint of reducing the glare influencing the pedestrian or the driver of the vehicle, and the improvement of the visualizing performance enabling the driver to see a pedestrian or other potential trouble area or object or the like is not considered.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages described above.

Accordingly, it is an aspect of the present invention to provide a technology capable of improving a visualizing performance enabling a driver to see a pedestrian or the like in a driving environment where luminance changes.

Accordingly, according to an aspect of the invention, there is provided a headlamp control device comprising a visual object luminance estimating unit which estimates a visual object luminance based on information about a captured image of an area in front of a vehicle; an adapted state estimating unit which estimates an adaptation luminance based on the information about the captured image; a recognition limit estimating unit which estimates a recognition limit luminance, which is recognized in a visual object range, based on at least the adaptation luminance; a visual object recognition determining unit which determines whether the visual object luminance is less than the recognition limit luminance; and a light distribution control unit which controls a light distribution of a headlamp unit provided in a vehicle such that the visual object luminance is included in a range of the recognition limit luminance, if the visual object luminance is less than the recognition limit luminance.

Other aspects and advantages of the present invention will be apparent from the following description, the drawings and the claims.

DETAILED DESCRIPTION OF EXEMPLARY EMBODIMENTS

[Initial Considerations]

Figure 1:
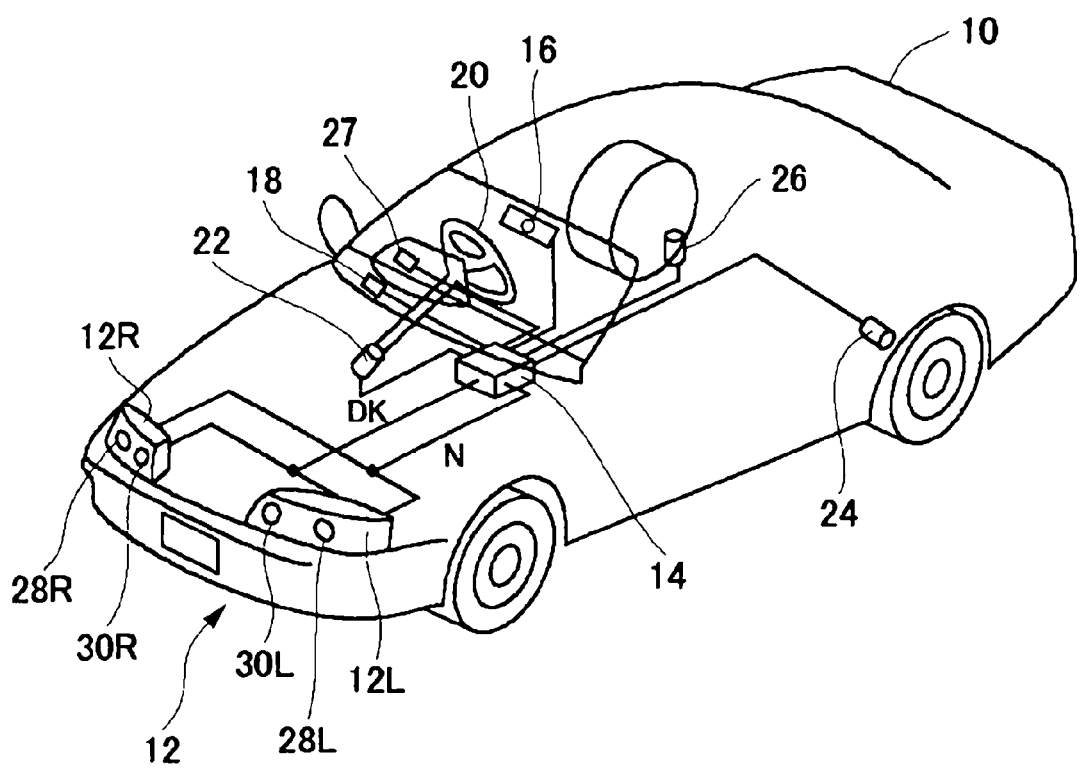
FIG. 1 is a schematic view showing a vehicle provided with a vehicle headlamp according to an exemplary embodiment of the invention.

As an initial matter, as one of various types of Adaptive Front-lighting Systems (AFSs) which are currently developed in order to improve a visualizing performance, a type has been carefully studied which selects a low beam from a plurality of modes such as a normal low beam, a city beam (town beam), a highway driving beam, and a bad weather driving beam in accordance with a driving environment.

However, in traffic environments as described below, a disadvantage arises in the visualizing performance. For example, in a night traffic environment in a city place where traffic accidents frequently occur, environmental luminance may change abruptly. In this case, a pedestrian seen in a front half bright range of a track cannot be seen abruptly in a rear half dark range of the track. Accordingly, a traffic accident risk involved with the pedestrian increases.

In addition, in the case where a pedestrian is a visual object and a background of the pedestrian is bright due to a roadway lighting or the like, a driver can easily see the pedestrian. However, in a case where the background is dark, the driver cannot easily see the pedestrian. In a moving space where only a point having the roadway lighting is seen in a cross point or the like, a change in the visual illumination environment simultaneously changes a visualizing ability of the driver. Thus, the driver may not be enabled to see the pedestrian or the like, which may induce an accident caused by the driver's nonfeasance. In addition, at the time when a vehicle crosses an oncoming vehicle irradiating the normal low beam, it is difficult to see an obstacle or a pedestrian in front of the vehicle due to the glare of a headlamp of the oncoming vehicle.

The change in the visual environment may be addressed in such a manner that the change in the visual environment is measured by using an illumination sensor or an image sensor and then a light distribution of the headlamp is controlled based on the data. However, the illumination or image data obtained by the above-described sensors does not take into account the details of a driver's visual performance.

The ability of the driver to sense the surrounding visual environment (i.e., the driver's visual performance) changes in accordance with the visual environment. That is, when the luminance of the visual environment changes, the adaptation luminance changes, and hence a visible range changes. In addition, it takes a certain amount of time for the driver to adapt to a change in luminance, for example as the driver's eyes adjust to a change in luminance of the surrounding area. Accordingly, the present inventor has discovered that it is advantageous to perform illumination control in consideration of the recognition limit and the adaptation characteristic.

(1) Control in Light of Recognition Limit

The visible range (upper limit luminance to lower limit luminance, capable of determining the contents of the visual object) under a certain adaptation luminance condition is referred to as a dynamic range (DR) of a visual system, such that DR=(upper limit luminance)/(lower limit luminance). Here, the adaptation luminance may be recognized as, for example, luminance (average luminance) of a plane (area) where a driver's eyes are adapted. In other words, the adaptation luminance corresponds to the luminance when the driver's eyes are adapted to the luminance of the visual field. In a case in which the luminance of the visual object (e.g., a pedestrian, an object fallen onto a road surface, and the like) in the visual environment is not more than the DR in the adaptation luminance, the forward illumination light intensity of the headlamp is improved so as to improve the forward luminance of the visual field.

(2) Control in Light of Adaptation Characteristic (State)

An adaptation luminance change is generated when the luminance of the visual environment changes (i.e., a roadway light is turned on or a vehicle comes upon a lit section of roadway, a vehicle passes near a store so as to be lit by light from the store, a vehicle enters a lit tunnel at night, or an unlit tunnel during the day, or the vehicle crosses an oncoming vehicle, etc.). The adaptation luminance change changes the dynamic range. In addition, since it takes a certain amount of time for a certain adaptation luminance change, the visual function during the certain amount of time. Accordingly, it is advantageous to guarantee the visual function change in accordance with the adaptation luminance change.

In detail, when the vehicle moves from a bright visual environment place to a dark visual environment place, an illumination performance is optimally controlled even at the time during which the adaptation luminance change is taking place. In addition, when the vehicle passes the oncoming vehicle, the adaptation luminance increases, but it is advantageous to control the illumination light intensity in accordance with the increase state. Accordingly, in exemplary embodiments of the present invention, a headlamp unit such as a headlamp is controlled based on the above considerations.

Exemplary Embodiment

Exemplary embodiments of the present invention will be now described with reference to the drawings.

Hereinafter, an exemplary embodiment of the present invention will be described in detail with reference to the accompanying drawings. In addition, the same reference numerals will be given to the same components in the description of the drawings, and the repetitive description thereof will be appropriately omitted.

FIG. 1 is a schematic view showing a vehicle provided with a vehicle headlamp according to an exemplary embodiment. As shown in FIG. 1, a vehicle 10 according to the exemplary embodiment includes: a headlamp device 12; a control system 14 which is a headlamp control device used to control irradiation of light emitted from the headlamp device 12; various sensors which detect information on a driving environment of the vehicle 10 and then output a detection signal to the control system 14; a forward monitor camera 16 which monitors a vehicle forward range; and an antenna 18 which receives a path signal from a GPS satellite and then outputs the path signal to the control system 14.

Various sensors are provided. For example, a steering sensor 22 detects a steering angle of a steering wheel 20, a vehicle speed sensor 24 detects a vehicle speed of the vehicle 10, a height sensor 26 (note that only one sensor provided in a rear axle is shown) detects the heights of the front and rear axles in order to detect a horizontal state (leveling) of the vehicle 10, and an illumination sensor 27 detects illumination in the periphery of the vehicle. The sensors 22, 24, 26, and 27 are coupled to the control system 14.

The headlamp device is not particularly limited as long as the light distribution of the irradiated light is changed in accordance with the adaptation luminance or the luminance of the visual object range. For example, a halogen lamp, a gas discharge headlamp, or a light emitting diode (LED) headlamp may be employed. In the exemplary embodiment, the type in which the lamp is swiveled is exemplified for the description.

The headlamp device 12 includes left and right headlamp units 12R and 12L. The headlamp units 12R and 12L have the same configuration except that the inner structures thereof are bilaterally symmetric with each other. A low-beam lamp unit 28R and a high-beam lamp unit 30R are disposed inside a right lamp housing, and a low-beam lamp unit 28L and a high-beam lamp unit 30L are disposed inside a left lamp housing.

Based on the outputs of various sensors, the control system 14 controls the swivelable headlamp units 12R and 12L, which are respectively mounted to the left and right sides of the front part of the vehicle. That is, the control system 14 controls the vehicle headlamp 12 capable of changing a light distribution characteristic of the vehicle headlamp 12 when the irradiation direction is controlled to be deflected in a transverse direction and a vertical direction. As the swivelable headlamp units 12R and 12L, for example, there is known a swivelable headlamp unit which is adapted to rotate a reflector or a projector lamp provided therein in a horizontal direction and includes a rotation driving mechanism rotatably driven by a driving power source such as a driving motor. According to this kind of AFS, it is possible to illuminate a curved road in accordance with a driving speed of the vehicle when the vehicle travels in the curved road, and thus to effectively improve the travel safety.

(Vehicle Headlamp)

Figure 2:
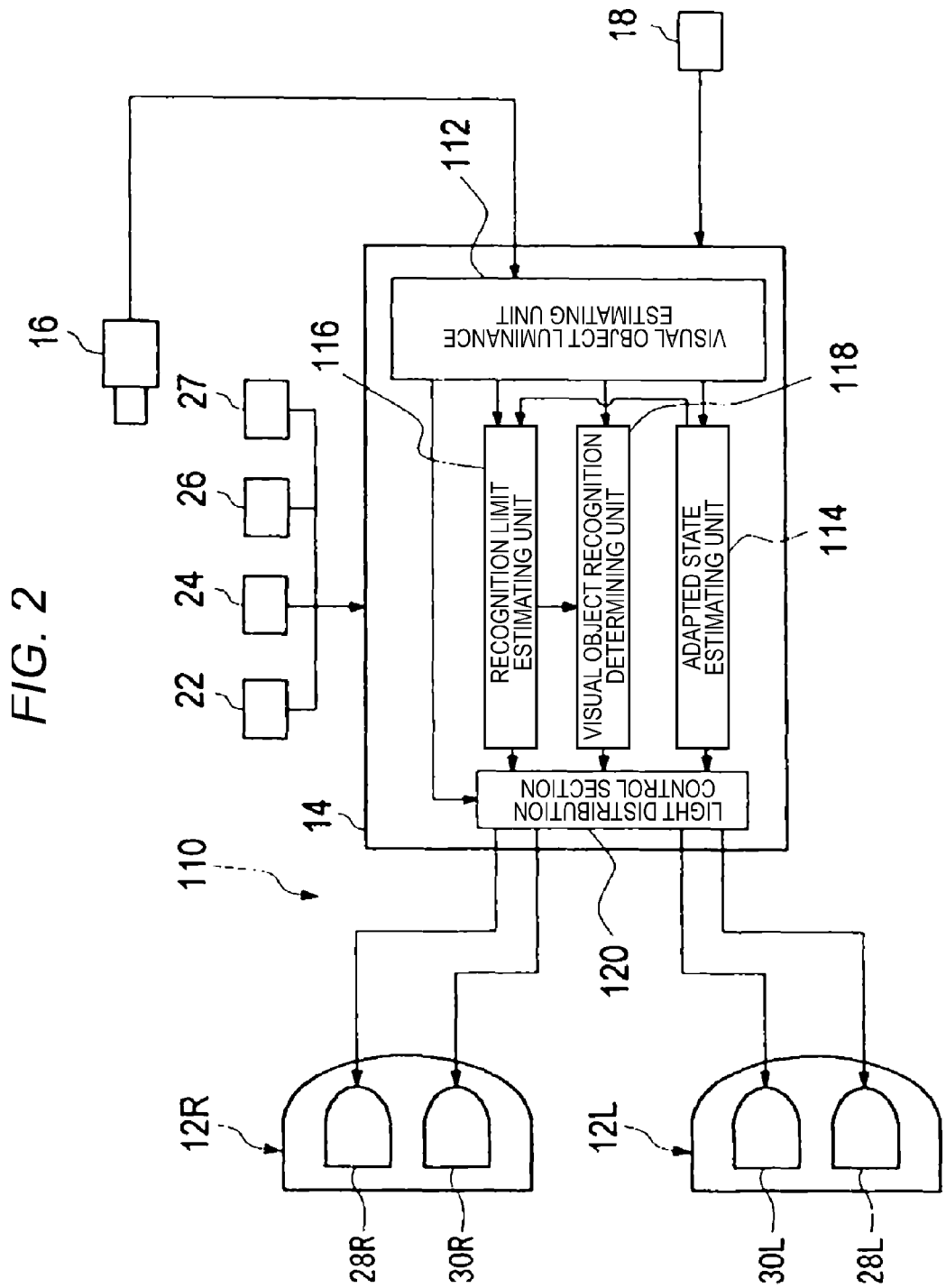
FIG. 2 is a block diagram showing a schematic configuration of the vehicle headlamp of FIG. 1.

Next, a vehicle headlamp according to an exemplary embodiment will be described. FIG. 2 is a block diagram showing a schematic configuration of a vehicle headlamp 110. The vehicle headlamp 110 includes the headlamp units 12R and 12L and the control system 14 which controls the irradiation of the light emitted from the headlamp units 12R and 12L. In addition, in the vehicle headlamp 110, the control system 14 determines a light distribution control condition in accordance with the driver's visual environment, and then controls the irradiation of the light emitted from the headlamp units 12R and 12L based on the determined light distribution control condition.

The control system 14 is coupled to the forward monitor camera 16 so as to obtain a captured image including the driver's visual object in front of the vehicle. In addition, the control system 14 is coupled to the steering sensor 22, the vehicle speed sensor 24, the height sensor 26, and the illumination sensor 27 so as to detect steering information or a vehicle speed which is used as a reference upon determining the driving condition.

(Control System)

The control system 14 includes: a visual object luminance estimating unit 112; an adapted state estimating unit 114; a recognition limit estimating unit 116; a visual object recognition determining unit 118; and a light distribution control unit 120.

The visual object luminance estimating unit 112 estimates a visual object luminance as a luminance in a driver's visual object range based on information of the vehicle forward captured image obtained by the forward monitor camera 16. The adapted state estimating unit 114 estimates a driver's adaptation luminance based on the information of the vehicle forward captured image. The recognition limit estimating unit 116 estimates a recognition limit luminance enabling the driver to recognize the visual object range based on at least an adaptation luminance. The visual object recognition determining unit 118 determines whether the visual object luminance is less than a range of limit luminance. The light distribution control unit 120 controls the light distribution of the headlamp units 12R and 12L provided in the vehicle such that the visual object luminance is included in the range of the recognition limit luminance, in the case where the visual object luminance is less than the range of the recognition limit luminance.

The forward monitor camera 16 is an image sensor such as a CCD or a CMOS sensor, and obtains information on a road line shape, existence of an oncoming vehicle or a preceding vehicle, a location, or the like of the vehicle, based on the image data. The information may be any information that is useful for the driver in driving the vehicle and which may be obtained by a visual image. Also, the forward monitor camera 16 may obtain the above information together with other sensors, such as radar sensors.

Figure 3:
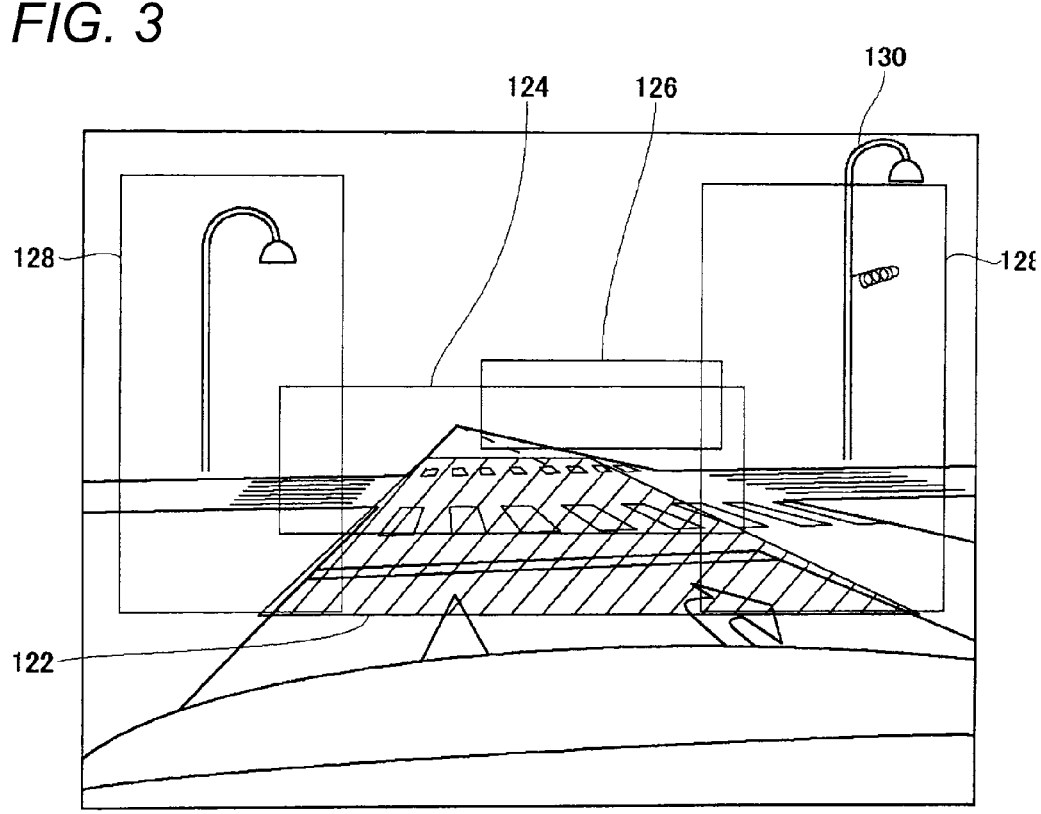
FIG. 3 is a view showing an example in which a visual field is divided into ranges.

The visual object luminance estimating unit 112 divides a visual field image from the data obtained by the forward monitor camera 16 into a plurality of blocks, removes noise (e.g., a high-luminance boundary line or vehicle light from the visual object range used for checking for a pedestrian or obstacle) from the characteristic of the visual object, and then calculates the luminance of the visual object or average luminance in the block. FIG. 3 is a view showing an example in which the visual field image is divided into a plurality of ranges. As shown in FIG. 3, based on the data of the obtained visual field image, the visual object luminance estimating unit 112 is capable of dividing the visual field image into a plurality of blocks such as a main track range 122 in front of the vehicle, a visual object range 124 corresponding to the driver's visual object, an oncoming vehicle range 126 where an oncoming vehicle may exist, and a peripheral range 128 on both sides of the main track range 122 in consideration of the characteristic points of the image. In addition, generally, it is advantageous to correct the block positions in accordance with the shape (vertical and transverse curves). In this case, the block positions are changed by the command from a block position changing unit (not shown).

Figure 4:
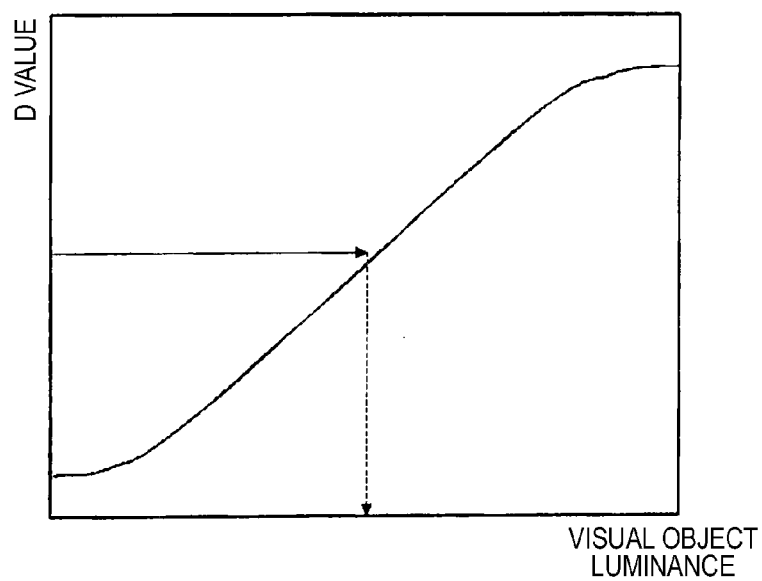
FIG. 4 is a diagram showing an example of a graph showing a relationship between visual object luminance and image density D.

Next, for example, the luminance of the visual object range is obtained based on the image data of the block. When the relationship between the image density and the luminance of the visual object range is obtained, the conversion from the image data to the luminance can be obtained in consideration of the exposure condition. FIG. 4 is a diagram showing an example of a graph showing a relationship between the visual object luminance and the image density D.

Figure 5:
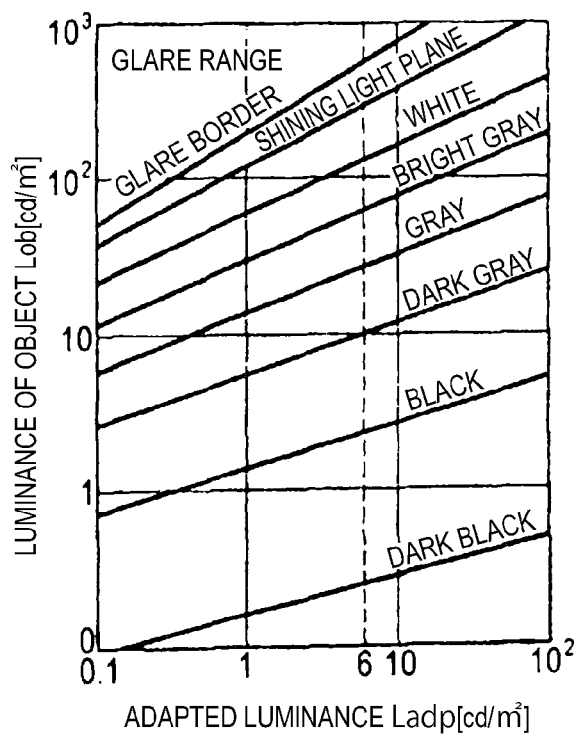
FIG. 5 is a graph showing a luminance tone of the visual object luminance under various adaptation luminance conditions.

The recognition limit estimating unit 116 estimates the driver's recognition limit luminance based on the visual object luminance obtained from the visual object luminance estimating unit 112 and the adaptation luminance data obtained by the adapted state estimating unit 114. Many research examples about the recognition limit luminance have been made, but, in order to describe the recognition limit luminance, there is used the graph described in page 227 of "Illumination Engineering" written by OTANI Yasuyuki et al., Revised Edition, Electric Association (Ohmsha, Ltd.), Sep. 12, 1978. FIG. 5 is a graph showing the luminance tone of the visual object luminance under various adaptation luminance conditions.

The graph shown in FIG. 5 is a diagram showing the luminance tone of the visual object at certain luminance among the luminance (adaptation luminance) of the visual environment. When the visual object luminance is too high, it is not possible to accurately recognize the visual object due to glare. On the other hand, when the visual object luminance is too low, it is not possible to recognize the visual object due to lack of light. The recognition limit has an upper limit and a lower limit, where the upper limit is between white and a shining light plane, and the lower limit is between dark gray and black.

When the graphs of the luminance tones are changed to the functions involved with the adaptation luminance ($L_{adp}$) and the object luminance ($L_{ob}$), the function of the certain luminance tone is given by Equation (1).

$$\text{Log}(L_{ob}) = A \cdot \text{Log}(L_{adp}) + B \tag{1}$$

Herein, A and B are a coefficient and an integer of an intercept, respectively.

In addition, when a luminance tone index is denoted by x and the x is applied to quadric and quartic polynomial equation, the following Equations (2) and (3) are obtained.

$$A = 0.0022x^2 + 0.0299x + 0.2604 \quad (2)$$

$$B = -0.0022x^4 + 0.0412x^3 - 0.2858x^2 + 1.1923x - 0.799 \quad (3)$$

Furthermore, when the upper and lower limits of the recognition limit luminance are respectively denoted by a dynamic DR, a certain adaptation luminance DR is given by the following equation (4).

$$DR_{adp} = 0.4015(L_{adp})^3 + 2.2164(L_{adp})^2 + 8.9172(L_{adp}) + 20.762 \quad (4)$$

Herein, since, as described above, DR=(upper limit luminance)/(lower limit luminance), it is possible to obtain the upper limit luminance and the lower limit luminance of the certain adaptation luminance using the above equations (1) to (4). In addition, the above-described method of obtaining the upper and lower limits of the recognition limit luminance is just an example, but the upper and lower limits may be, of course, obtained by a theoretical method, an experiment using a subject, past data, or the like. For example, only the lower limit luminance may be obtained by the data of Blackwell (1946) or Adrian (1989).

The visual object recognition determining unit 118 determines whether the pedestrian existing in the visual object range is visible by comparing the average luminance in the visual object range obtained by the visual object luminance estimating unit 112 with the lower limit luminance obtained by the recognition limit estimating unit 116. At this time, for example, when the oncoming vehicle exists in the oncoming vehicle range, the glare caused by the light of the oncoming vehicle is considered. In addition, after the visual object recognition determining unit 118 determines whether the visual object existing in a far position is visible, the visual object recognition determining unit 118 outputs the determination resultant to the light distribution control unit 120.

The adapted state estimating unit 114 estimates the driver's adaptation luminance and the adapted state in consideration of the following viewpoints based on the data obtained by the visual object luminance estimating unit 112.

(1) The adaptation luminance is obtained by the glare of the oncoming vehicle or the luminance of the visual environment. Additionally, the increasing state of the adaptation luminance is considered based on a variation thereof.

(2) Further, in the environment where the adaptation luminance decreases on the contrary to the case of (1), a recovery state without the glare or the roadway lighting is considered.

(3) The respective adapted states (1) and (2) are obtained, and the adaptation luminance at this time point is obtained.

The case of the light distribution control in light of the adapted state will be described below in detail. Generally, the adaptation luminance may be appropriately set to the average luminance in the main track range 122 shown in FIG. 3. Accordingly, since the adaptation luminance is estimated based on the luminance of the main track range 122 which is easily calculated as the average luminance and is easily adapted to the eyes in the driver's visual field, it is possible to simply estimate the range of the recognition limit luminance with high precision. However, in the case where there exists a high-luminance light source such as from an oncoming vehicle causing glare in front of the vehicle or a bright roadway lighting 130 in the peripheral range 128, a veiling luminance, i.e., Veiling Glare (VG) described later in consideration of the influence is added to the average luminance of the main track range 122. In addition, although it is not described in detail, the average luminance of the visual object range 124 may be used as the adaptation luminance.

Next, the variation of the adapted state influences the visualizing performance, but the influence will be described by referring to two cases, that is, a case where the visual environmental luminance changes and a case where the glare of the oncoming vehicle exists.

(Variation of Adaptation Luminance Due to Variation of Visual Environmental Luminance)

When the environmental luminance involved with the main track range, the peripheral range, and the like decreases compared with the precedent state, the driver's visual perception of the forward range decreases. Such a case is caused when the vehicle travels from a place without lighting and crosses into an area brightly illuminated by an illuminating device. However, in this case, the driver's pupillary diameter does not change, and the adapted state so far is not directly adapted to the low luminance (sensitivity improvement). That is, a certain time is required for the driver's eyes to become adapted to the darker visual environment. Accordingly, the vehicle headlamp 110 according to the exemplary embodiment illuminates the forward range for a certain time (adapted recovery time), thereby improving the visualizing performance capable of seeing the pedestrian or the obstacle as the visual object.

(Variation of Adaptation Luminance Due to Glare of Oncoming Vehicle)

Upon crossing the oncoming vehicle, the adaptation luminance increases due to the glare of the oncoming vehicle, and the low-luminance visual object is difficult to be seen. In this case, the forward illumination light intensity is increased. In addition, an increased amount of the adaptation luminance due to the glare is given by the veiling luminance VG defined by Equation (5).

$$VG = \Sigma I/(D^2\theta(\theta-1.5)) \quad (5)$$

In Equation (5), θ denotes an angle (unit; °) formed between the oncoming vehicle and the driver's visual field, D denotes a distance between vehicles, I denotes the light intensity (illumination) of the light source causing the glare, and VG denotes a value obtained by adding the plural headlamps existing in the visual field.

Figure 6:
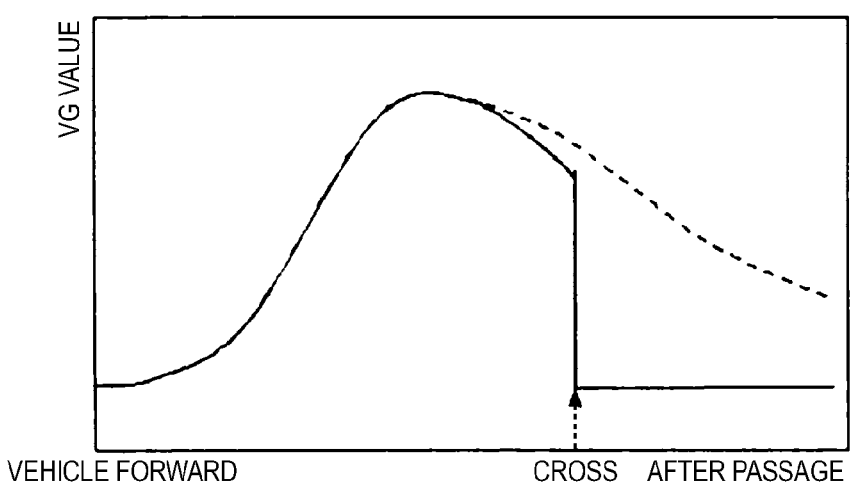
FIG. 6 is a graph showing a variation in veiling glare (VG) value before and after a vehicle and an oncoming vehicle cross each other.

FIG. 6 is a graph showing a variation in VG value before and after the vehicle and the oncoming vehicle cross each other. As shown in FIG. 6, the VG value is low in the case where the oncoming vehicle exists at a position far away from the vehicle, but increases as the vehicle moves closer to the oncoming vehicle, where the VG value becomes a maximum value at a position located in front of the vehicle by several tens of meters. Then, when the oncoming vehicle moves to a position on the side of the vehicle (the oncoming vehicle crosses the vehicle), the VG value abruptly decreases and only the VG value corresponding to the luminance of the road surface exists.

However, the driver's adapted state does not directly change in accordance with the luminance of the road surface. That is, it takes a certain amount of time to return to the adapted state in accordance with the luminance of the road surface as depicted by the dotted line in the drawing. Accordingly, upon crossing the oncoming vehicle, the vehicle headlamp 110 brightly illuminates the forward range in consideration of an increase of the glare and the recovery from the adapted state according to the glare to the adapted state according to the luminance of the road surface for a certain time during which the oncoming vehicle exists in the forward range and the vehicle crosses the oncoming vehicle. Thus, it is possible to improve the visualizing performance capable of seeing the pedestrian or the obstacle as the visual object.

At this time, the time that it takes for the recovery to the adapted state according to the luminance of the road surface may be determined by performing a test or a simulation. For the reference, for example, the test result is reported in "Eye Sensitivity during Adapted Transition" written by Yoko INOUE and Katsumi ITO, Japanese Architectural Association Measuring System Collected Papers, 1995, No. 468, Pages 11 to 16.

Figure 7:
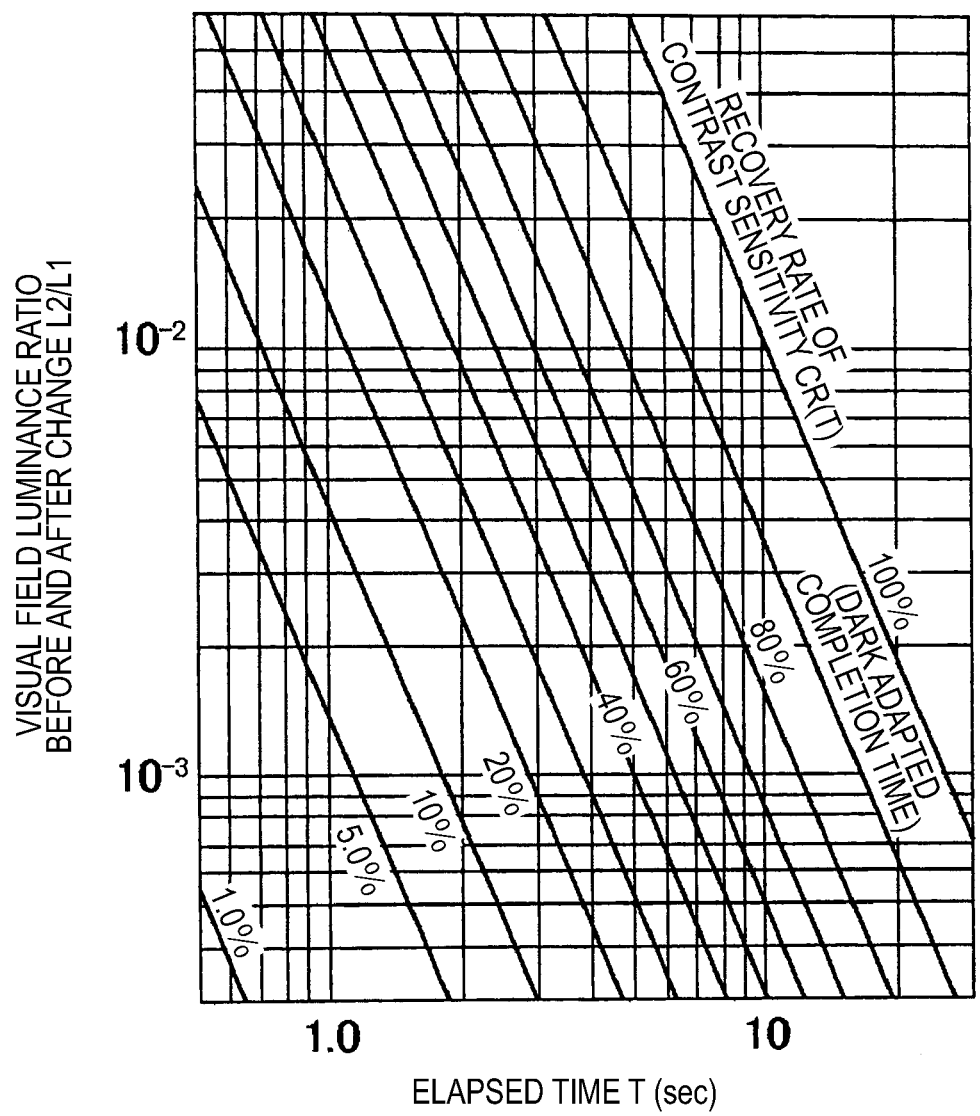
FIG. 7 is a graph showing a relationship between an elapsed time and a recovery rate of a contrast sensitivity in a case where visual field luminance changes from high luminance to low luminance.

FIG. 7 is a graph showing a relationship between an elapsed time and a recovery rate of a contrast sensitivity in the case where the visual field luminance changes from the high luminance to the low luminance. In the graph shown in FIG. 7, when a recovery rate r is set to a parameter, y=log (L2/L1), and x=log (elapsed time T), General Equation (6) between the x and y is given as follows.

$$y=ax+b \quad (6)$$

The coefficients "a" and "b" of Equation (6) are obtained using an analytical geometry method. The coefficient "a" is substantially uniform and a=−2.423 regardless of the "r". The constant "b" changes in accordance with the "r", and is substantially $1^{st}$-order linear at the recovery rate r of 0.2 or more. The regression equation is obtained as Equation (7).

$$b=2.7064r-2.4187 \quad (7)$$

When Equation (7) is applied to Equation (6), finally Equation (6) is obtained as following Equation (8). However, T is 0.2 or more.

$$\log(L2/L1)=-2.423 \times \log(T)+2.7064 \times r-2.4187 \quad (8)$$

In the actual application, when L1 and L2 corresponding to the adaptation luminance variation caused by the glare of the oncoming vehicle or the visual environmental luminance variation and the recovery rate (generally, 0.7 to 0.8) are applied to Equation (8), the recovery time is obtained. The detailed example is shown as below.

(1) The case of the adapted recovery in accordance with a variation in the visual environmental luminance; the recovery time T is obtained when the average luminance in the visual object range or the road surface before a certain time is set to L1, and the average luminance at the same position after a certain time is set to L2, and the recovery rate is set to 70%.

(2) The case of the glare recovery; the recovery time T is obtained as in (1) in the paragraph above when the VG at the peak is set to L1 and the VG without the glare is set to L2.

Accordingly, it is possible to adjust the illumination light intensity so as to correspond to the adapted state {the adaptation luminance and the adapted transition phenomenon (adapted recovery)} as described above.

Figure 8:
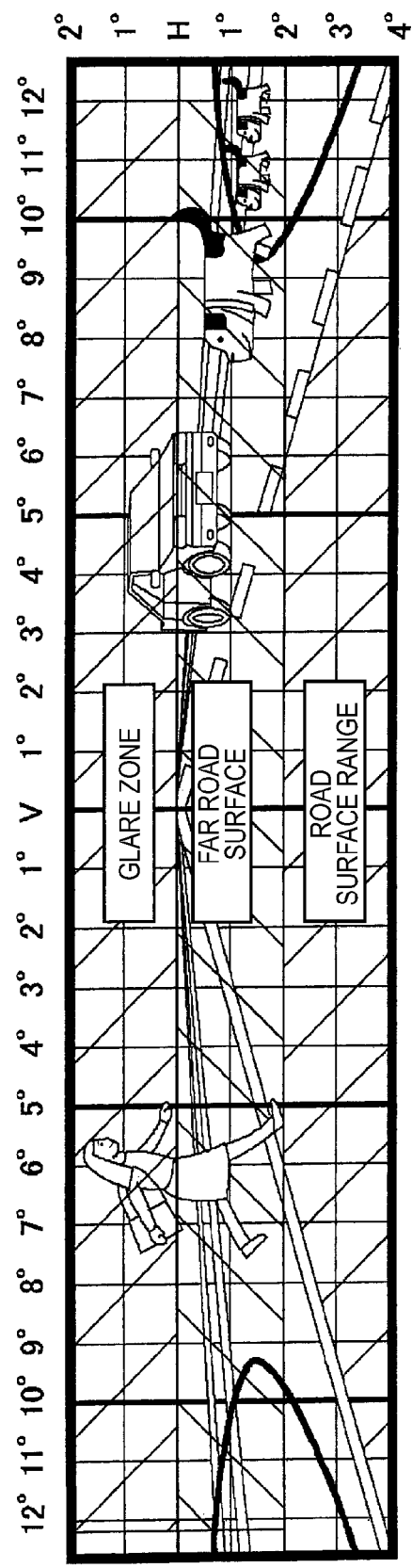
FIG. 8 is a schematic view showing an example of a visual field and a light distribution control range.

Next, the light distribution unit 120 will be described. The light distribution control unit 120 controls the irradiation range and the irradiation intensity based on the information obtained by the visual object luminance estimating unit 112, the adapted state estimating unit 114, the recognition limit estimating unit 116, and the visual object recognition determining unit 118. FIG. 8 is a schematic view showing a visual field and a light distribution control range.

As shown in FIG. 8, in the main track range, for example, when the external light or the oncoming vehicle does not exist in the range located in front of the lane by about 10 to 40 m (a direction tilted by about −1° to about −4° with respect to the horizontal direction H), the average luminance in the range corresponds to the adaptation luminance. The light distribution control in the range is carried out only in the case of a rainy day. In addition, the far road surface corresponds to the road surface located in front of the lane by 20 m or more (a direction tilted by about 0° to about −2° with respect to the horizontal direction H) and corresponds to the visual object range, which is the range for checking the existence of the pedestrian or the obstacle. In the exemplary embodiment, the light distribution in the range is mainly controlled. Additionally, the glare zone is the region above the horizontal direction H, and in the range, the light distribution is controlled so as not to excessively give glare in accordance with the existence of the pedestrian or the oncoming vehicle.

Next, the detailed light distribution control method will be described. In addition, various light distribution control methods are known in accordance with the configuration of the headlamp unit, but the methods are not particularly limited as long as the light distribution can be controlled such that the visual object luminance is included in the recognition limit luminance in the case where the visual object luminance is less than the range of the recognition limit luminance. For example, in the case where the head lamp is an LED lamp, the irradiation light intensity may be controlled in such a manner that the far road surface shown in FIG. 8 is divided into two ranges and the glare zone shown in the same drawing is divided into eight ranges. Further, in the case where the glare zone is not provided, the light distribution in the range of the far road surface may be controlled in a vertical direction. In addition, in the case where the head lamp is a Gas Discharge Head Lamp (GDHL), the light distribution may be controlled by moving the cutoff line using the shade corresponding to a rotary shade Advanced Safety Vehicle (ASV) type which are divided into left and right portions. Further, the light distribution may be controlled by turning on an auxiliary lamp.

(Flowchart of Light Distribution Control)

Figure 9:
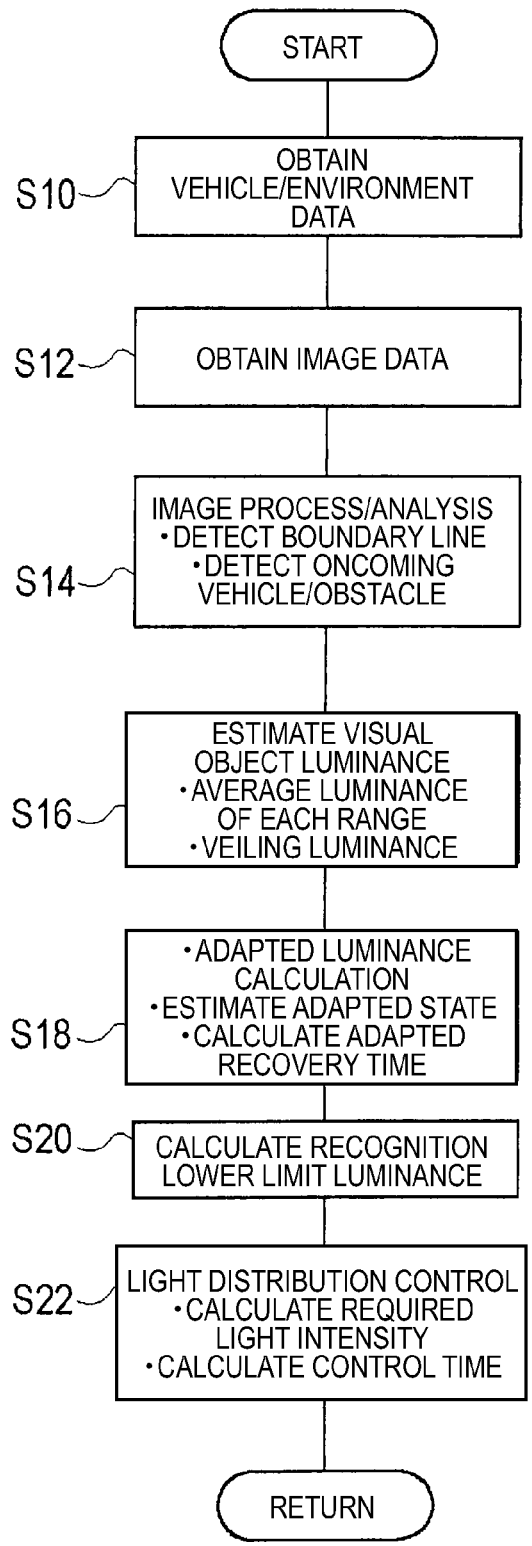
FIG. 9 is a diagram showing a flowchart of a light distribution control according to an exemplary embodiment of the invention.

FIG. 9 is a flowchart of a light distribution control according to the exemplary embodiment. The light distribution control is started by meeting a certain timing or a certain condition. When the control is started, the vehicle data such as the vehicle speed or the steering data required for the swivel control of the headlamp or the environment data such as the illumination data of the illumination sensor or the data representing the wiper manipulation state used for estimating the driving environment are obtained (Operation S10). When the illumination data is used as the reference data upon determining the luminance in various ranges of the visual environment, it is possible to improve the precision upon calculating the environmental luminance. In addition, the data representing the wiper manipulation state is used to estimate the weather state.

Next, the image data and the image capturing condition (an aperture, a frame rate, and a shutter speed) are obtained using the forward monitor camera 16 serving as the visual environment data obtaining unit (CCD and CMOS cameras; monocle and stereo) (Operation S12). In addition, the forward monitor camera 16 detects the boundary line, the pedestrian, and the oncoming vehicle by performing an edge process on the obtained image data (Operation S14). At this time, by using the data obtained by the milliwave radar, it is possible to improve the detection precision.

Next, the glare intensity or the average luminance in the visual object block (range) is estimated by the visual object luminance estimating unit 112 based on the image capturing condition and the image data obtained by the forward monitor camera 16 (Operation S16). In addition, in the case where the road is a curved road, the position of the visual object block is changed. When the road is determined as the curved road based on the boundary line data obtained by the forward monitor camera 16 or the navigation data obtained by the GPS, the block positions of the visual object, the road surface, the periphery, and the oncoming vehicle are changed in the screen by using the block position changing unit.

In addition, the visual object luminance corresponding to a parameter for the light distribution control is obtained by calculating the average luminance in the range where the visual object exists, and actually, the luminance of the pedestrian captured as an image is not measured. This is because the luminance of the pedestrian changes in accordance with the reflectivity of the clothes of the pedestrian. In addition, the visual object luminance is determined by multiplying the average luminance by a certain coefficient, except for the noise in the visual object range. This is because 5% of reflectivity is commonly used in dark clothes. Further, regarding the road surface, the average luminance is obtained except for the bright boundary line. Regarding the peripheral range, the average luminance is calculated except for the noise light source portion. Furthermore, regarding the glare of the oncoming vehicle, the luminance is high and the exposure over occurs in the camera having the general dynamic range function (dynamic range is about 50 in a CCD camera) in many cases. In the case of using such a camera, the VG value is calculated based on the distance relative to the oncoming vehicle and the light distribution standard.

Next, the adaptation luminance, the adapted state, the adapted recovery time, and the like are calculated by the adapted state estimating unit 114 based on the average luminance of the range of the visual object or the road surface and the veiling luminance of the glare of the oncoming vehicle obtained by the visual object luminance estimating unit 112 (Operation S18). The adaptation luminance is a value obtained by adding the veiling luminance VG of Equation (5) to the average luminance of the main track range. The adapted state is determined as one of the increasing state, the peak state, and the recovery state after the peak state by comparing a luminance with the adaptation luminance before a certain time. In addition, the increasing state is a state where the oncoming vehicle moves closer to the vehicle or the vehicle moves to a city. Generally, the peak state is a state where the oncoming vehicle exists at a position located in front of the vehicle by several tens of meters. The recovery state starts after the peak state and is a state where the vehicle moves from a bright main street to a dark city street or suburb. The adaptation luminance L1 before a certain time (peak time), the adaptation luminance L2 at this time, and the recovery rate r (for example, 0.8) are applied to Equation (8), and thus the recovery time T is obtained.

In addition, the recognition lower limit luminance is calculated by the recognition limit estimating unit 116 (Step S20). The recognition lower limit luminance is calculated in such a manner that the coefficients A and B are obtained by using, for example, 1.5 (between black and dark black) as the x (luminance tone index) of Equation (2) and Equation (3). The adaptation luminance $L_{adp}$ is obtained in consideration of the recovery rate with respect to the elapsed time from the peak time, and then the adaptation luminance $L_{adp}$ is applied to Equation (1). Further, in the case where the noise light source such as a store illuminating device, a vehicle, or a road surface sign mainly exists in the visual field, a deviation may be generated in the veiling luminance of the glare of the oncoming vehicle and the average luminance in the visual object range or the road surface calculated by the visual object luminance estimating unit 112 and the adaptation luminance calculated by the adapted state estimating unit 114. For this reason, the data may be calculated by the movement average for a certain time. Accordingly, it is possible to suppress a deviation of each calculated value.

The light distribution control unit 120 compares the recognition limit luminance with the average luminance of the visual object range calculated by the visual object luminance estimating unit 112 and the adapted state estimating unit 114. When the visual object luminance is less than the recognition lower limit luminance, the light distribution control is determined by calculating the insufficient light intensity of the illumination toward the visual object range (Operation S22). Also, the light distribution control depends on the configuration of the head lamp. For example, the illumination range zone may be expanded, the vertical cutoff amount may be controlled or the light intensity toward a certain zone may be increased in the visual object range or the oncoming vehicle/preceding vehicle range. The light distribution control unit 120 transmits information representing the control contents to the headlamp device 12, and the headlamp device 12 controls the light source components and the optical components based on the control contents.

Likewise, even in the case where the luminance of the visual object range changing in accordance with the driving environment is less than the recognition limit luminance, if the light distribution of the headlamp units 12R and 12L is controlled such that the visual object luminance is included in the range of the recognition limit luminance, it is possible to improve the visualizing performance enabling the driver to see the visual object, for example, the pedestrian.

In addition, the light distribution control unit 120 controls the light distribution of the headlamp units 12R and 12L so as to alleviate the decrease amount of the adaptation luminance in the case where the adaptation luminance more decreases than that of the precedent state. Accordingly, for example, even when the vehicle moves to a dark adaptation luminance place without lighting via a bright adaptation luminance place such as the cross point brightly illuminated by the illuminating device, it is possible to suppress the deterioration of the visualizing performance enabling the driver to see the visual object.

Further, the light distribution control unit 120 controls the light distribution of the headlamp units 12R and 12L such that the luminance of the visual object range increases in accordance with the increase amount of the adaptation luminance in the case where the adaptation luminance more increases than that of the precedent state. Accordingly, for example, even in the case where the vehicle moves to the bright adaptation luminance place influenced by the glare of the oncoming vehicle in traveling the dark adaptation luminance place, it is possible to suppress the deterioration of the visualizing performance enabling the driver to see the visual object.

Furthermore, the adapted state estimating unit 114 estimates the adaptation luminance based on the information of the veiling luminance VG considering the influence of the glare of the oncoming vehicle in the case where the vehicle forward captured image includes the high-luminance light source, for example, the oncoming vehicle turning on the headlamp. Particularly, the adaptation luminance is easily influenced by the bright range among the driver's visual field. Accordingly, since the adaptation luminance is estimated based on the information of the range including the high-luminance light source such as the roadway lighting or the glare of the oncoming vehicle, it is possible to control the light distribution of the headlamp units 12R and 12L such that the visual object luminance is included in the range of the recognition limit luminance without giving discomfort to the driver.

Next, the case where the above-described light distribution control is applied to the actual driving environment will be described. In detail, the actual traffic scenes such as a city main street (busy street), a city commercial area, and a suburb residential area are supposed, and the light distribution control according to the exemplary embodiment will be described with reference to the supposed traffic scenes.

(1) City Main Street (Busy Street)

In the city main street, there are many roadway lights, store illuminating devices, and advertisement signs, and the average luminance (adaptation luminance) of the peripheral range, the visual object range, and the main track range is relatively high. In such a place, the headlamp illumination effect does not appear substantially. Rather, the glare of the headlamp creates an obstacle in seeing the pedestrian or the like. For the light distribution of the headlamp in such a place, a dark beam (informing the existence of the vehicle) of the town beam level of the AFS is used.

(2) City Commercial Area

In this area, the average luminance of the peripheral range, the visual object range, and the main track range is lower than that of the city main street. However, the driving speed is higher than that of the city main street, and the traffic volume is substantially the same as that of the city main street. Also, since there are few store illuminating devices and roadway lightings on the outskirts of the commercial area, the average luminance of the peripheral range, the visual object range, and the main track range reduces further. In such a district, the common low-beam level is used. However, on the outskirts of the commercial area, roadway lights typically exist only at cross roads, and particularly the visual object range becomes dark after passing through the cross road. Accordingly, for example, the visual object range 124 shown in FIG. 3 may be controlled to be bright in accordance with the existence state of the oncoming vehicle.

(3) Suburb Residential Area

In this area, the traffic volume is relatively less. However, in the residential area, there exists many visual objects such as pedestrians and small animals. In such an area, the light intensity of the headlamp device 12 may be controlled such that the visual object range is brightly illuminated compared with the common low beam.

The above-described examples correspond to the movement example from the bright visual environment to the dark visual environment. The average luminance of the main track range is considered as the adaptation luminance, and the recognition lower limit luminance of the adaptation luminance is compared with the average luminance of the visual object range, thereby changing the light distribution in consideration of the glare of the oncoming vehicle. Meanwhile, on the contrary, in the movement example from the dark suburb to the bright main street, the average luminance of the visual object range and the peripheral range largely changes. In addition, this case may be occurred upon approaching the cross point where the roadway lighting exists.

In this case, although it is not particularly limited in the exemplary embodiment, the light distribution may be changed based on the recognition upper limit luminance of the dynamic range. That is, in the adaptation luminance $L_{adp}$ of the dynamic range of Equations (1) to (4), when the dynamic range DR is obtained by using, for example, 3 (gray) as the luminance tone index x, using the road surface average luminance, the recognition upper limit luminance is obtained. When the average luminance of the visual range is brighter than the recognition upper limit luminance, the light distribution may be controlled such that the visual object range becomes darker in the vehicle moving direction. The illumination type using the recognition limit upper limit luminance may be also applied to a tunnel outlet illuminating device.

In the control system 14 as the headlamp control device according to the exemplary embodiment and the vehicle headlamp 110 having the control system 14, it is possible to perform the detailed light distribution control particularly at a traffic visual environment (the illumination state and the oncoming vehicle state) at night, and thus to prevent the traffic accident.

According to an aspect of the invention, there is provided a headlamp control device including: visual object luminance estimating unit for estimating visual object luminance as luminance in a driver's visual object range based on information of an obtained vehicle forward captured image; adapted state estimating unit for estimating a driver's adaptation luminance based on the information of the vehicle forward captured image; a recognition limit estimating unit for estimating recognition limit luminance, which is recognized by a driver in the visual object range, based on at least the adaptation luminance; a visual object recognition determining unit for determining whether visual object luminance is less than a range of the recognition limit luminance; and a light distribution control unit for controlling a light distribution of a headlamp unit provided in a vehicle so that the visual object luminance is included in the range of the recognition limit luminance in the case where the visual object luminance is less than the range of the recognition limit luminance.

With such a configuration, even in the case where the luminance of the visual object range changing in accordance with the driving environment is less than the recognition limit luminance, if the light distribution of the headlamp unit is controlled so that the visual object luminance is included in the range of the recognition limit luminance, it is possible to improve the visualizing performance enabling the driver to see the visual object, for example, the pedestrian.

The light distribution control unit may control the light distribution of the headlamp unit so as to alleviate a decrease amount of the adaptation luminance in the case where the adaptation luminance decreases. Accordingly, for example, even in the case where a vehicle moves from a bright adaptation luminance place to a dark adaptation luminance place, it is possible to suppress a deterioration of the visualizing performance enabling the driver to see the visual object.

The light distribution control unit may control the light distribution of the headlamp unit so as to increase luminance of the visual object range in accordance with an amount of increase of the adaptation luminance in the case where the adaptation luminance increases. Accordingly, for example, even in the case where the vehicle moves from the dark adaptation luminance place to the bright adaptation luminance place, it is possible to suppress the deterioration of the visualizing performance enabling the driver to see the visual object or the like.

The adapted state estimating unit may estimate the adaptation luminance based on information of at least a main track range among the vehicle forward captured image. Since the adaptation luminance is estimated based on the luminance of the main track range easily adapted to a driver's eyes in the driver's visual field, it is possible to simply estimate the range of the recognition limit luminance with high precision.

The adapted state estimating unit may estimate the adaptation luminance based on information of an area including a high-luminance light source in the case where the high-luminance light source is included in the vehicle forward captured image. Particularly, the adaptation luminance is easily influenced by a bright area within the driver's visual field. Accordingly, since the adaptation luminance is estimated based on the information of the area including the high-luminance light source, it is possible to control the light distribution of the headlamp unit so that the visual object luminance is included in the range of the recognition limit luminance without giving discomfort to the driver. Here, the high-luminance light source is, for example, a self light emitting light source such as a light of an oncoming vehicle, a roadway light, or a store illuminating device.

According to another aspect of the invention, there is provided a vehicle headlamp. The vehicle headlamp according to another aspect includes: a headlamp unit which is provided in a vehicle; and the above-described headlamp control device which controls irradiation of light emitted from the headlamp unit.

Also, embodiments of the present invention include various operations. The operations (the control system 14) associated with embodiments of the present invention may be performed by hardware components or may be embodied in machine-executable instructions, which may be used to cause a general-purpose or special-purpose processor or logic circuits programmed with the instructions to perform the operations. Alternatively, the operations (the control system 14) may be performed by a combination of hardware and software.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A headlamp control device comprising:
    a visual object luminance estimating unit which estimates a visual object luminance based on information about a captured image of an area in front of a vehicle;
    an adapted state estimating unit which estimates an adaptation luminance of a driver of the vehicle based on the information about the captured image, wherein the adaptation luminance is held at a recovery state for a time period after a peak visual object luminance is estimated, the recovery state being a higher luminance than a luminance based solely on the visual object luminance;
    a recognition limit estimating unit which estimates a recognition limit luminance of the driver based on at least the adaptation luminance, wherein the recognition limit luminance represents a luminance in which the driver can recognize an object in the area in front of the vehicle;
    a visual object recognition determining unit which determines whether the visual object luminance is less than the recognition limit luminance; and
    a light distribution control unit which controls a light distribution of a headlamp unit provided in a vehicle such that the visual object luminance is included in a range of the recognition limit luminance, if the visual object luminance is less than the recognition limit luminance.

2. A headlamp control device comprising:
    a visual object luminance estimating unit which estimates a visual object luminance which is luminance in a driver's visual object range, based on information about a vehicle forward captured image, wherein the visual object luminance represents a luminance of an object in front of the vehicle in the driver's visual object range;
    an adapted state estimating unit which estimates a driver's adaptation luminance of the driver based on the information about the vehicle forward captured image, wherein the adaptation luminance is held at a recovery state for a time period after a peak visual object luminance is estimated, the recovery state being a higher luminance than a luminance based solely on the visual object luminance;
    a recognition limit estimating unit which estimates a recognition limit luminance of the driver based on at least the adaptation luminance, wherein the recognition limit luminance represents a luminance in which the driver can recognize the object;
    a visual object recognition determining unit which determines whether the visual object luminance is less than the recognition limit luminance; and
    a light distribution control unit which controls a light distribution of a headlamp unit provided in a vehicle such that the visual object luminance is included in a range of the recognition limit luminance, if the visual object luminance is less than the recognition limit luminance.

3. The headlamp control device according to claim 2, wherein the light distribution control unit controls the light distribution so as to counteract a decrease in an amount of the adaptation luminance, if the adaptation luminance decreases.

4. The headlamp control device according to claim 2, wherein the light distribution control unit controls the light distribution so as to increase a luminance of the visual object range in accordance with an increase in an amount of the adaptation luminance, if the adaptation luminance increases.

5. The headlamp control device according to claim 2 wherein the adapted state estimating unit estimates the adaptation luminance based on information about at least a main track range of the vehicle forward captured image.

6. The headlamp control device according to claim 2, wherein the adapted state estimating unit estimates the adaptation luminance based on information about an area including a high-luminance light source, if the high-luminance light source is included in the vehicle forward captured image.

7. A vehicle headlamp comprising:
    a headlamp unit which generates a light distribution; and
    a headlamp control device comprising:
        a visual object luminance estimating unit which estimates a visual object luminance which is luminance in a driver's visual object range, based on information about a vehicle forward captured image, wherein the visual object luminance represents a luminance of an object in front of the vehicle in the driver's visual object range;
        an adapted state estimating unit which estimates a driver's adaptation luminance based on the information about the vehicle forward captured image, wherein the adaptation luminance is held at a recovery state for a time period after a peak visual object luminance is estimated, the recovery state being a higher luminance than a luminance based solely on the visual object luminance;
        a recognition limit estimating unit which estimates a recognition limit luminance of the driver based on at least the adaptation luminance wherein the recognition limit luminance represents a luminance in which the driver can recognize the object;
        a visual object recognition determining unit which determines whether the visual object luminance is less than the recognition limit luminance; and
        a light distribution control unit which controls the light distribution of the headlamp unit such that the visual object luminance is included in a range of the recognition limit luminance, if the visual object luminance is less than the recognition limit luminance.

* * * * *